United States Patent
Von Berg

(10) Patent No.: US 9,835,480 B2
(45) Date of Patent: Dec. 5, 2017

(54) MULTITURN ROTARY ENCODER

(71) Applicant: DR. JOHANNES HEIDENHAIN GMBH, Traunreut (DE)

(72) Inventor: Martin Von Berg, Übersee (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 448 days.

(21) Appl. No.: 14/555,862

(22) Filed: Nov. 28, 2014

(65) Prior Publication Data

US 2015/0149112 A1  May 28, 2015

(30) Foreign Application Priority Data

Nov. 27, 2013  (DE) .......................... 10 2013 224 247

(51) Int. Cl.
- *G01C 9/00*  (2006.01)
- *G01D 15/00*  (2006.01)
- *G01D 5/14*  (2006.01)

(52) U.S. Cl.
CPC .............. *G01D 15/00* (2013.01); *G01D 5/145* (2013.01)

(58) Field of Classification Search
CPC ......... G01D 15/00; G01D 5/145; G01D 5/245
See application file for complete search history.

(56) References Cited

U.S. PATENT DOCUMENTS

| | | |
|---|---|---|
| 7,406,772 B2 | 8/2008 | Siraky |
| 7,471,080 B2 | 12/2008 | Sasaki et al. |

(Continued)

FOREIGN PATENT DOCUMENTS

| | | |
|---|---|---|
| DE | 28 17 172 | 10/1979 |
| DE | 10 2008 051 083 | 4/2008 |

(Continued)

OTHER PUBLICATIONS

European Search Report, dated Apr. 2, 2015, issued in corresponding European Patent Application No. 14183386.3.

*Primary Examiner* — Fernando Hidalgo
(74) *Attorney, Agent, or Firm* — Andrews Kurth Kenyon LLP

(57) ABSTRACT

A multiturn rotary encoder includes: a single-turn unit, including a code carrier that is able to be scanned by a single-turn scanner in order to generate single-turn position signals, and a single-turn evaluation unit for processing the single-turn position signals to form at least one single-turn code word that indicates the absolute position of an input shaft within one revolution; a first multiturn unit dependent on a power supply, including at least a first multiturn code carrier that is able to be scanned by a first multiturn scanner in order to generate first multiturn position signals, and a first multiturn evaluation unit for processing the first multiturn position signals to form a first multiturn code word that indicates the number of revolutions executed by the input shaft; and a second multiturn unit independent of a power supply, including at least a second multiturn code carrier that is able to be scanned by a second multiturn scanner in order to generate second multiturn position signals, and a second multiturn evaluation unit for processing the second multiturn position signals to form a second multiturn code word which likewise indicates the number of revolutions executed by the input shaft. The value of the first multiturn code word of the first multiturn unit in an initialization phase after the power supply of the multiturn rotary encoder has been switched on is able to be referenced with the value of the second multiturn code word.

10 Claims, 5 Drawing Sheets

(56) References Cited

U.S. PATENT DOCUMENTS

| | | | | |
|---|---|---|---|---|
| 8,154,427 B2* | 4/2012 | Mayer | ............... | G01D 5/145 250/231.13 |
| 8,825,439 B2 | 9/2014 | Mayer et al. | | |
| 2009/0039872 A1* | 2/2009 | Fischer | ............ | G01D 5/145 324/207.13 |
| 2011/0063145 A1* | 3/2011 | Mayer | ............... | G01D 5/145 341/116 |

FOREIGN PATENT DOCUMENTS

| | | |
|---|---|---|
| DE | 10 2007 062 780 | 7/2008 |
| DE | 10 2009 029 431 | 3/2011 |
| EP | 1 457 762 | 9/2004 |
| EP | 1 462 771 | 9/2004 |

* cited by examiner

MULTITURN ROTARY ENCODER

CROSS-REFERENCE TO RELATED APPLICATIONS

The present application claims priority to Application No. 10 2013 224 247.6, filed in the Federal Republic of Germany on Nov. 27, 2013, which is expressly incorporated herein in its entirety by reference thereto.

FIELD OF THE INVENTION

The present invention relates to multiturn rotary encoders and methods for operating multiturn rotary encoders. Multiturn rotary encoders of this type may be used, for example, in automation technology to measure angular positions and the number of revolutions executed by shafts.

BACKGROUND INFORMATION

Position-measuring devices for measuring the angular position of a shaft are familiar from a multitude of publications. Such position-measuring devices are referred to as rotary encoders. Moreover, if a position-measuring device is designed such that, in addition to the angular position of the shaft, it is also possible to measure the number of revolutions executed by the shaft, this is referred to as a multiturn rotary encoder.

In principle, two design approaches are used for implementing the multiturn unit, e.g., the unit for determining the number of revolutions executed by the shaft, first of all, multiturn units based on gears, and secondly, multiturn units based on counters.

In the case of gear-based multiturn units, the input shaft actuates one or perhaps several gear stages which gear down the input speed. Given a gear stage having a reduction ratio of 16:1, for example, the output shaft of the gear stage rotates one time per 16 revolutions of the input shaft. The output shaft in turn drives a code carrier, whose angular position allows conclusions about the number of revolutions of the input shaft per unit time.

An example for a gear-based multiturn rotary encoder is described in German Published Patent Application 28 17 172. It relates to a multi-stage incremental shaft encoder having a first angular-increment code disk and a plurality of downstream angular-increment code disks.

European Published Patent Application No. 1 457 762 describes a device for measuring the position, the displacement, or the rotational angle of an object. It includes three measuring standards in the form of three successive code disks, which are coupled via a differential toothed gear. The code disks are scanned by a scanning unit radially covering the code tracks of all code disks.

Gear-based multiturn units are independent of a power supply per se, that is, they function when the rotary encoder is in the switched-off state, as well. That is quite simply because the code disks, driven by the gearing, rotate even without a power supply. After the rotary encoder has been switched on again, the number of revolutions executed by the input shaft may be determined by ascertaining the angular position of the code disks of the multiturn unit.

Counter-based multiturn units ascertain the number of revolutions executed by a shaft by counting the revolutions of a code carrier which is driven directly by the shaft, and therefore executes the same number of revolutions as the shaft to be measured. Located on the code carrier is a code which is scanned by a scanning unit. Based on the position signals ascertained by the scanning unit, counting signals are generated in counter electronics for a counter which counts—as a function of the direction of rotation—the number of complete revolutions of the code carrier, and therefore of the shaft. Without further measures, counter-based multiturn units are dependent on a power supply, that is, when the power supply of the rotary encoder is switched off, first of all, the value of the counter is lost, and secondly, revolutions of the shaft can no longer be counted. After being switched on again, the counter is reset.

In order to store the counter reading of the counter even when the main power supply is switched off, e.g., for example, when the machine in which the multiturn rotary encoder is operated is switched off, and in addition, to maintain the counting function, counter-based multiturn units are frequently equipped with a battery which takes over the energy supply for at least the multiturn unit of the rotary encoder upon loss of the main power supply.

For example, European Patent No. 1 462 771 describes a multiturn rotary encoder having a counter-based multiturn unit which is operated with a battery when in the switched-off state.

These and other measures which make it possible to upgrade a counter-based multiturn unit to function independently of a power supply are costly, and are therefore to be avoided. Even the use of a battery is problematic, since even when working with power-saving electrical circuits, sooner or later it is necessary to change the battery.

For safety-related reasons, it may be necessary to measure the number of revolutions of a shaft redundantly, for example, when a faulty measurement may lead to damage of a machine on which the multiturn rotary encoder is operated, or may even result in danger for the operating personnel of the machine.

Therefore, German Published Patent Application No. 10 2009 029 431 describes a multiturn rotary encoder which is equipped with two multiturn units that are independent of a power supply. A comparison of the measured values of the multiturn units makes it possible to check the performance reliability of the multiturn rotary encoder at all times. It is therefore suitable for use in safety-related applications.

SUMMARY

Example embodiments of the present invention provide a multiturn rotary encoder which has a simple design and is suitable for safety-related applications.

According to an example embodiment of the present invention, a multiturn rotary encoder includes a single-turn unit, including a code carrier which is able to be scanned by a single-turn scanner in order to generate single-turn position signals, and a single-turn evaluation unit for processing the single-turn position signals to form at least one single-turn code word which indicates the absolute position of an input shaft within one revolution. The multiturn rotary encoder also includes a first multiturn unit, dependent on a power supply, including at least a first multiturn code carrier which is able to be scanned by a first multiturn scanner in order to generate first multiturn position signals, and a first multiturn evaluation unit for processing the first multiturn position signals to form a first multiturn code word that indicates the number of revolutions executed by the input shaft. The multiturn rotary encoder further includes a second multiturn unit, independent of a power supply, including at least a second multiturn code carrier which is able to be scanned by a second multiturn scanner in order to generate second multiturn position signals, and a second multiturn evaluation unit for processing the second multiturn position signals to form a second multiturn code word likewise indicating the number of revolutions executed by the input shaft. The value of the first multiturn code word of the first multiturn unit in an initialization phase after the power supply of the multiturn rotary encoder has been switched on is able to be referenced with the value of the second multiturn code word.

Example embodiments of the present invention provide a method for operating such a multiturn rotary encoder.

According to example embodiments of the present invention, a method for operating a multiturn rotary encoder having: a single-turn unit, including a code carrier which is able to be scanned by a single-turn scanner in order to generate single-turn position signals, and a single-turn evaluation unit for processing the single-turn position signals to form at least one single-turn code word which indicates the absolute position of an input shaft within one revolution; a first multiturn unit dependent on a power supply, including at least a first multiturn code carrier which is able to be scanned by a first multiturn scanner in order to generate first multiturn position signals, and a first multiturn evaluation unit for processing the first multiturn position signals to form a first multiturn code word that indicates the number of revolutions executed by the input shaft; and a second multiturn unit independent of a power supply, including at least a second multiturn code carrier which is able to be scanned by a second multiturn scanner in order to generate second multiturn position signals, and a second multiturn evaluation unit for processing the second multiturn position signals to form a second multiturn code word likewise indicating the number of revolutions executed by the input shaft; includes referencing the value of the first multiturn code word of the first multiturn unit in an initialization phase after the power supply of the multiturn rotary encoder has been switched on with the value of the second multiturn code word.

Further features and aspects of example embodiments of the present invention are described in more detail below with reference to the appended Figures.

DETAILED DESCRIPTION

Figure 1:
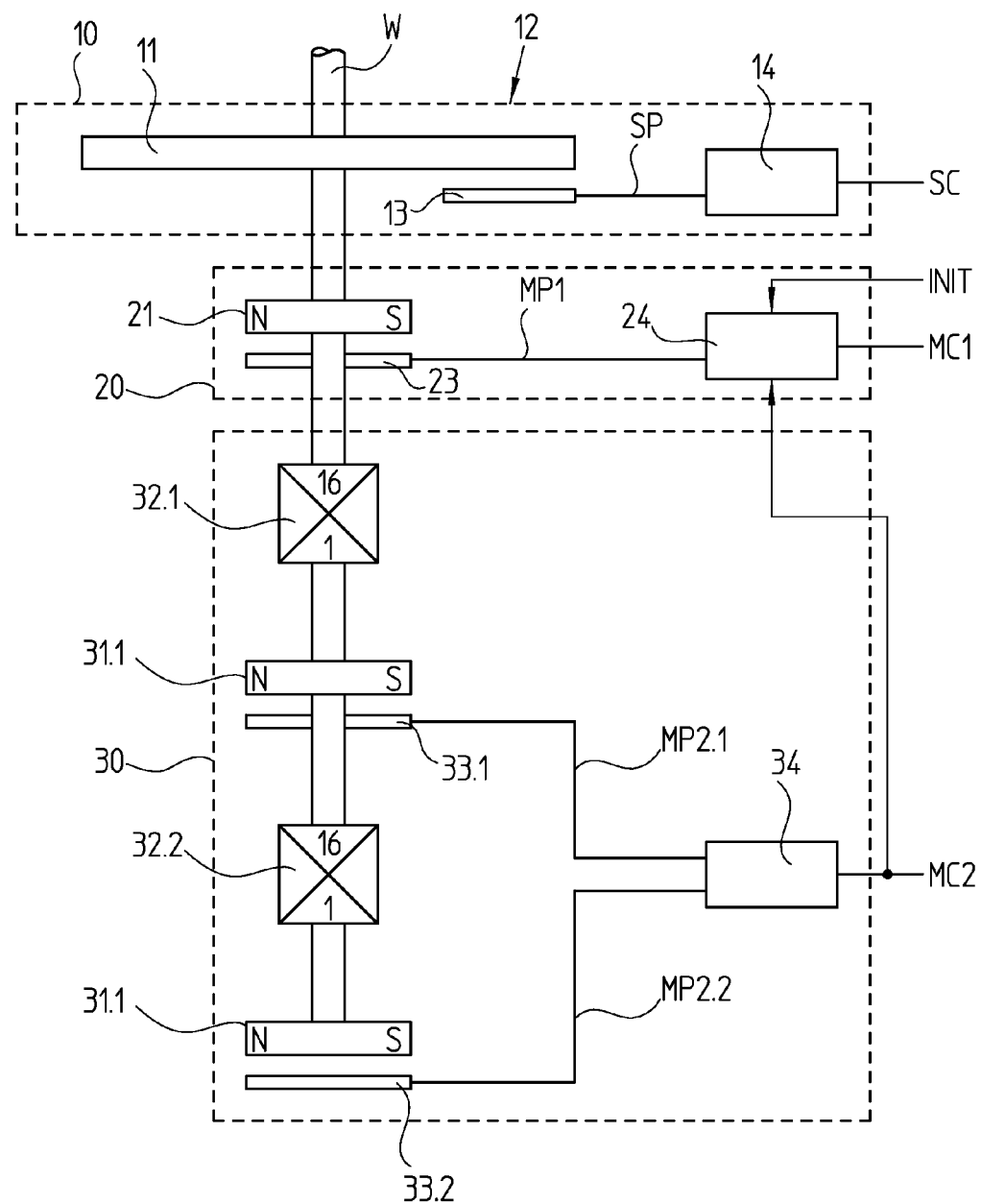
FIG. 1 schematically illustrates a multiturn rotary encoder according to an example embodiment of the present invention.

FIG. 1 schematically illustrates a multiturn rotary encoder according to an example embodiment of the present invention. It includes a single-turn unit 10, a first multiturn unit 20, and a second multiturn unit 30.

Single-turn unit 10 includes a code disk 11, which is coupled directly to an input shaft W to be measured. Code disk 11 bears a coding 12, able to be scanned photoelectrically, magnetically, capacitively, or inductively, in order to split one revolution of input shaft W into a plurality of distinguishable sectors. This coding 12 may be implemented in digital or analog fashion. For example, a digital coding 12 may be provided as a multi-track code, e.g., a Gray code, or perhaps by a single-track chain code referred to as a Pseudo Random Code (PRC). In the case of an analog coding 12, upon scanning, analog scanning signals are obtained, from whose amplitudes and/or phase relations, it is possible to determine the angular position of input shaft W. Coding 12 is scanned by a scanner 13 in order to form single-turn position signals SP. Single-turn position signals SP are fed to a single-turn evaluation unit 14 which forms and outputs at its output a multi-digit single-turn code word SC that indicates the absolute position of input shaft W within a single revolution.

Multiturn units 20, 30 are provided to ascertain the number of revolutions of input shaft W per unit time.

First multiturn unit 20 is a counter-based multiturn unit. It includes a first multiturn code carrier 21, which is likewise connected in rotatably fixed manner to input shaft W. First multiturn code carrier 21 has a single magnetic dipole, e.g., a north and a south pole. The poles are scanned by a first multiturn scanner 23. It has a plurality of sensor elements sensitive to magnetic fields, by which first multiturn position signals MP1 are able to be generated, from which, in a first multiturn evaluation unit 24, a first multiturn code word MC1 may be formed which indicates the absolute position of first multiturn code carrier 21. For example, the sensor elements are Hall sensors, MR (magnetoresistive) sensors or GMR (giant magneto-resistance) sensors. The sensor elements and first multiturn evaluation unit 24 may be integrated together on one semiconductor substrate.

Figure 2:
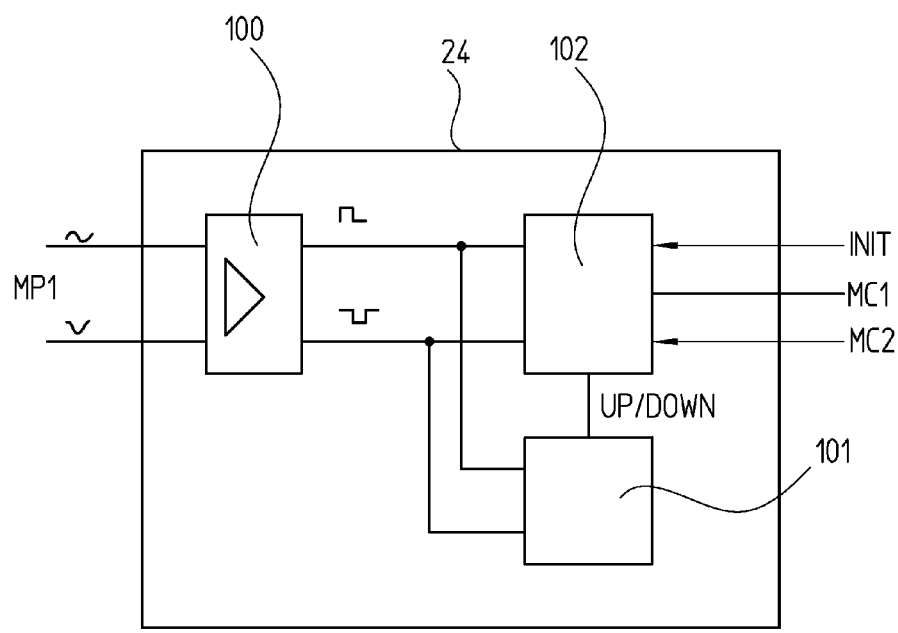
FIG. 2 is a block diagram of a first multiturn evaluation unit of the multiturn rotary encoder illustrated in FIG. 1.

FIG. 2 is a block diagram of first multiturn evaluation unit 24. In this context, it is assumed that first multiturn position signals MP1 include two signals which have a largely sinusoidal characteristic and pass through one complete period of the sinusoidal oscillation during one revolution of input shaft W. Usually these two signals have a phase shift of approximately 90° relative to each other, making it possible to determine the direction of rotation of input shaft W.

In first multiturn evaluation unit 24, first multiturn position signals MP1 are first fed to a signal-shaping unit 100 which, from the sinusoidal input signals, forms digital square-wave counting signals that it supplies first of all to a direction discriminator 101, and secondly, to a counter unit 102. Direction discriminator 101 determines the direction of rotation from the time sequence of the edges of the counting signals, and transmits it as direction signal UP/DOWN to counter unit 102. Counter unit 102 in turn uses at least one rising or falling edge of the counting signals, as well as direction signal UP/DOWN, for the direction-dependent counting of the revolutions of input shaft W.

Just as in the case of superordinate multiturn unit 20, no measures are provided in first multiturn evaluation unit 24 which also permit functioning when the multiturn rotary encoder is in the switched-off state. With the switch-off of the power supply, counter unit 102 loses the instantaneous count value, and a movement of input shaft W remains unnoticed. Multiturn unit 20 is thus a multiturn unit dependent on a power supply.

Second multiturn unit 30 is a gear-based multiturn unit which is illustrated with two gear stages 32.1, 32.2, for example. The number of gear stages needed is largely a function of the number of revolutions of input shaft W to be determined, as well as the number of revolutions determinable with one gear stage. If only a few revolutions of input shaft W are to be measured, then one gear stage may be sufficient. On the other hand, three and more gear stages may be necessary to determine the revolutions of a feed screw of a machine tool.

First gear stage 32.1 is coupled directly to input shaft W. It has a 16:1 gear reduction and its output shaft is in turn coupled to second gear stage 32.2 which likewise performs a reduction by the factor 16. Gear stages 32.1, 32.2 drive second multiturn code carriers 31.1, 31.2, respectively, which are scanned by second multiturn scanners 33.1, 33.2 in order to generate second multiturn position signals MP2.1, MP2.2. The information as to which of the countable revolutions input shaft W is in at the moment is coded in the angular position of second multiturn code carriers 31.1, 31.2. As is already the case for first multiturn code carrier 21, second multiturn code carriers 31.1, 31.2 are formed from only one magnetic dipole. Thus, second multiturn code carriers 31.1, 31.2 are scanned analogously to the scanning of first multiturn code carrier 21. Deviating from multiturn position signals MP1 of first multiturn unit 20, however, second multiturn position signals MP2.1, MP2.2 are interpolated in a second multiturn evaluation unit 34, that is, instantaneous values of multiturn position signals MP2.1, MP2.2 are assigned absolute values which indicate the angular position of respective multiturn code carriers 31.1, 31.2. The resolution of the instantaneous values corresponds at least to the reduction ratio of the associated gear stage. Finally, second multiturn evaluation unit 34 processes the ascertained absolute values of second multiturn position signals MP2.1, MP2.2 to form a second multiturn code word MC2.

In addition to the variant described here having a multi-stage reduction gear, gear-based multiturn units which, like European Published Patent Application No. 1 457 762 mentioned above proposes, are based on a differential toothed gear are also suitable.

It may be that due to the two multiturn units 20, 30 provided, two multiturn code words MC1, MC2, which are formed independently of each other, are available in the multiturn rotary encoder. However, because first multiturn unit 20 always begins to count anew after the power supply is switched on, it is impossible to determine immediately after the power supply is switched on whether the two multiturn units 20, 30 are functioning by comparing these two multiturn code words MC1, MC2.

The probability that gear-based multiturn units fail during the stoppage of the machine on which they are operated is extremely low. By implication, this means that after the machine, and therefore the multiturn rotary encoder, has been switched on, it may be assumed with very high probability that the measured value of gear-based multiturn unit 30 is correct.

Based on the foregoing, the value of first multiturn code word MC1 (generated in counter-based first multiturn unit 20 dependent on a power supply) in an initialization phase after the supply voltage has been switched on may be referenced with the value of second multiturn code word MC2 (generated by gear-based second multiturn unit 30 independent of a power supply). In other words, the value of second multiturn code word MC2 may be used as reference value in order to produce a reference between first multiturn code word MC1 and second multiturn code word MC2. By comparing these two multiturn code words MC1, MC2, it is then possible to draw conclusions about the correct functioning of multiturn units 20, 30 during further operation.

As illustrated in FIG. 1, the referencing may be accomplished in a manner that, for example, after the power supply is switched on, first multiturn unit 20 is initialized with the measured value of second multiturn unit 30 (e.g., second multiturn code word MC2). To that end, second multiturn code word MC2 is supplied to first multiturn evaluation unit 24, especially counter unit 102. The initialization is controlled by an initialization signal INIT, which likewise is supplied to multiturn evaluation unit 24. During further operation, multiturn code words MC1, MC2 are then generated independently of each other again by corresponding multiturn units 20, 30, so that by checking multiturn code words MC1, MC2 for equality, it is possible to reliably recognize a malfunction of one of multiturn units 20, 30.

Figure 3:
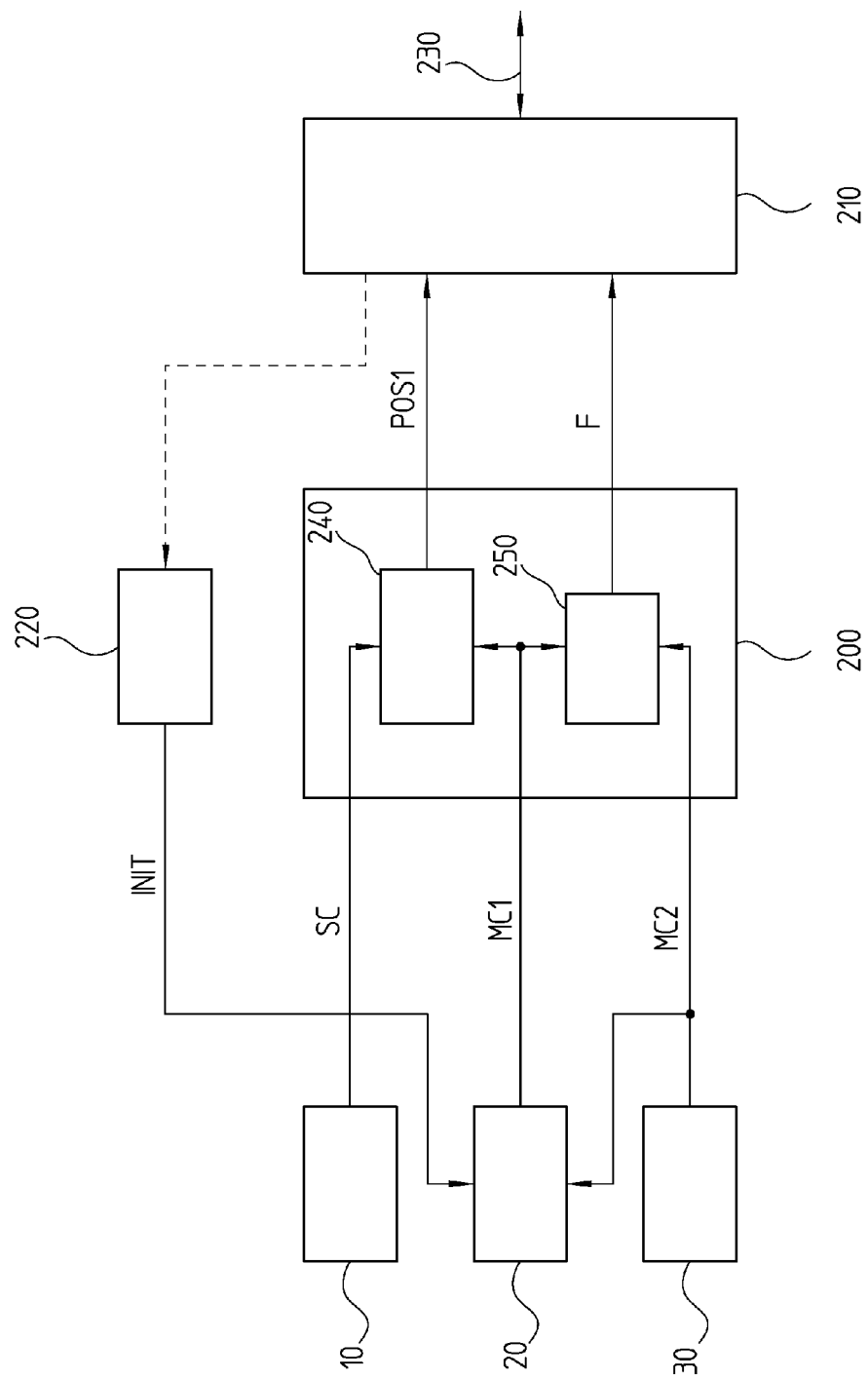
FIG. 3 is a block diagram of the multiturn rotary encoder illustrated in FIG. 1.

FIG. 3 is a block diagram of the multiturn rotary encoder illustrated in FIG. 1. It includes single-turn unit 10, first multiturn unit 20 and second multiturn unit 30, whose output signals SC, MC1, MC2 are fed to a processing unit 200. An interface unit 210 is provided for communication with sequential electronics via a data-transmission channel 230. For example, the data may be transmitted serially. Suitable serial interfaces are conventional and are therefore not described in further detail herein.

To generate initialization signal INIT, the multiturn rotary encoder also includes an initialization unit 220. It may be arranged such that initialization signal INIT is generated automatically after the power supply is switched on, as soon as second multiturn code word MC2 is available. Alternatively or additionally, the generation of initialization signal INIT may be triggered by the sequential electronics via interface unit 210, e.g., by the transmission of a special command from the sequential electronics to the multiturn rotary encoder.

In this exemplary embodiment, processing unit 200 is arranged such that first of all, a combined position-data word POS1 is generated in a code-connecting unit 240 from the single-turn code word and first multiturn code word MC1, and secondly, a comparator unit 250 is provided which, by comparing first multiturn code word MC1 to second multiturn code word MC2, assesses the proper functioning of multiturn units 20, 30, and outputs an ascertained fault as error flag F to interface unit 210. Position-data word POS1 and error flag F are transmittable via interface unit 210 and data-transmission channel 230 to the sequential electronics. The sequential electronics are able to evaluate status flag F and, in case of a fault, induce suitable measures, e.g., bringing the machine to an orderly stop.

Alternatively, it is also possible to dispense with processing unit 200, and to supply single-turn code word SC, first multiturn code word MC1, as well as second multiturn code word MC2 directly to interface unit 210 for transmission to the sequential electronics.

Figure 4:
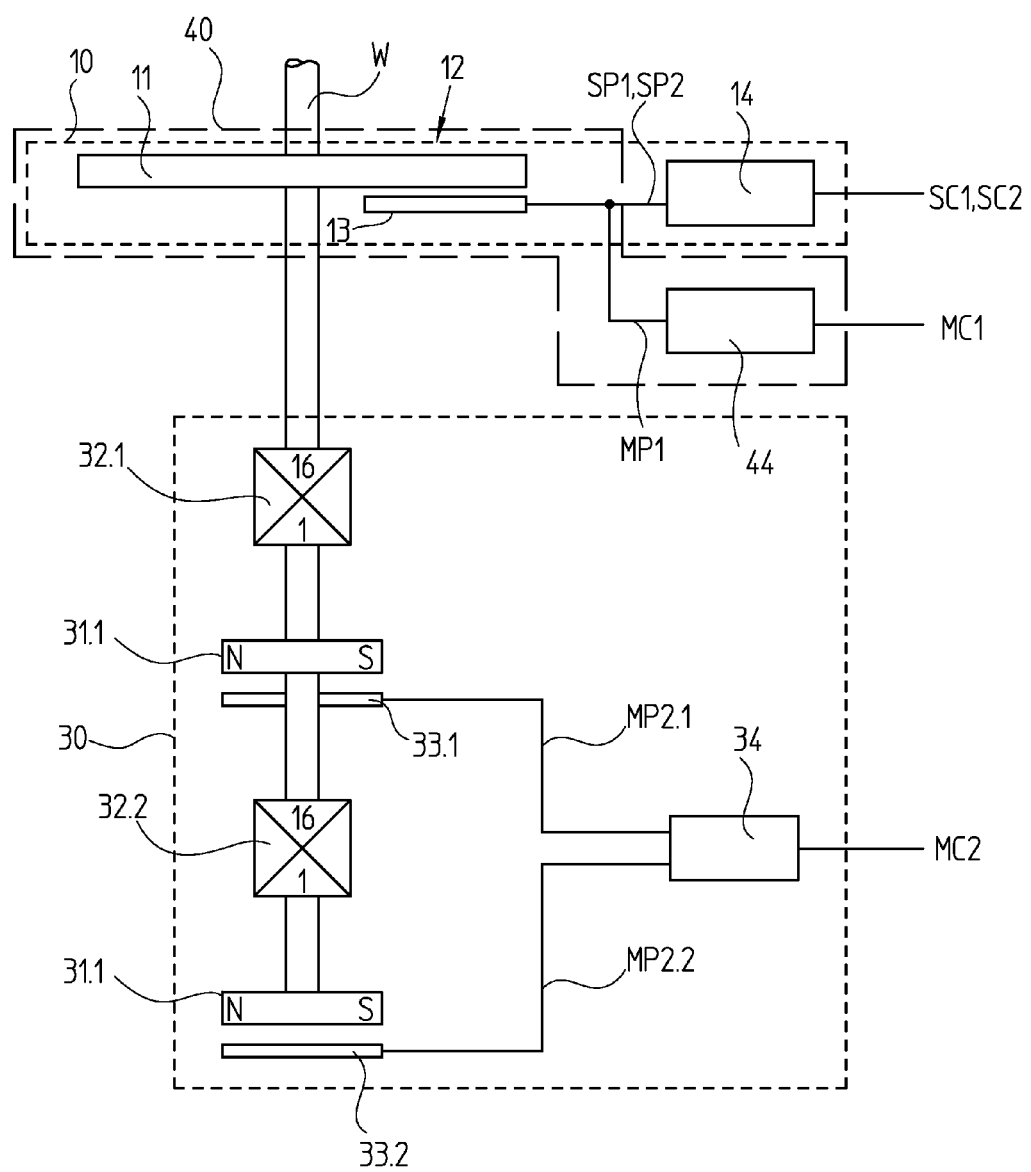
FIG. 4 schematically illustrates a multiturn rotary encoder according to an example embodiment of the present invention.

FIG. 4 schematically illustrates a multiturn rotary encoder according to an example embodiment of the present invention. It likewise includes single-turn unit 10, a first multiturn unit 40, and a second multiturn unit 30. Second multiturn unit 30 corresponds largely to the unit described in connection with FIG. 1, and is not described again.

In this example, single-turn unit 10 is arranged such that two mutually independent single-turn code words SC1, SC2 are generated. This may be achieved in that single-turn scanner 13 and single-turn evaluation unit 14 are two-channel. Thus, in single-turn scanner 13, two groups of single-turn position signals SP1, SP2 are obtained, from which corresponding single-turn code words SC1, SC2 are generated in single-turn evaluation unit 14.

On the other hand, first multiturn unit 40 makes use of the fact that single-turn position signals SP1, SP2, which result from the scanning of code 12 on code carrier 11 by single-turn scanner 13, may also be utilized to form a first multiturn code word MC1. Therefore, single-turn position signals SP1, SP2 of at least one of the two groups are supplied at least partially (insofar as they are necessary to form first multiturn code word MC1) as first multiturn position signals MP1 to a first multiturn evaluation unit 44, which from them, generates and counts counting signals for forming first multiturn code word MC1. Thus, first multiturn unit 40 is again a counter-based multiturn unit. No measures for also allowing first multiturn unit 40 to function when the power supply of the multiturn rotary encoder ceases are provided in this example either. Thus, it is again a multiturn unit dependent on a power supply.

In addition to first multiturn evaluation unit 44, in this exemplary embodiment, code carrier 11 having code 12, as well as single-turn scanner 13 are also to be assigned to first multiturn unit 40.

In this exemplary embodiment as well, the referencing of the value of first multiturn code word MC1 with the value of second multiturn code word MC2 may be accomplished as discussed in connection the exemplary embodiments previously described, by initialization of first multiturn evaluation unit 44 after the power supply has been switched on.

Figure 5:
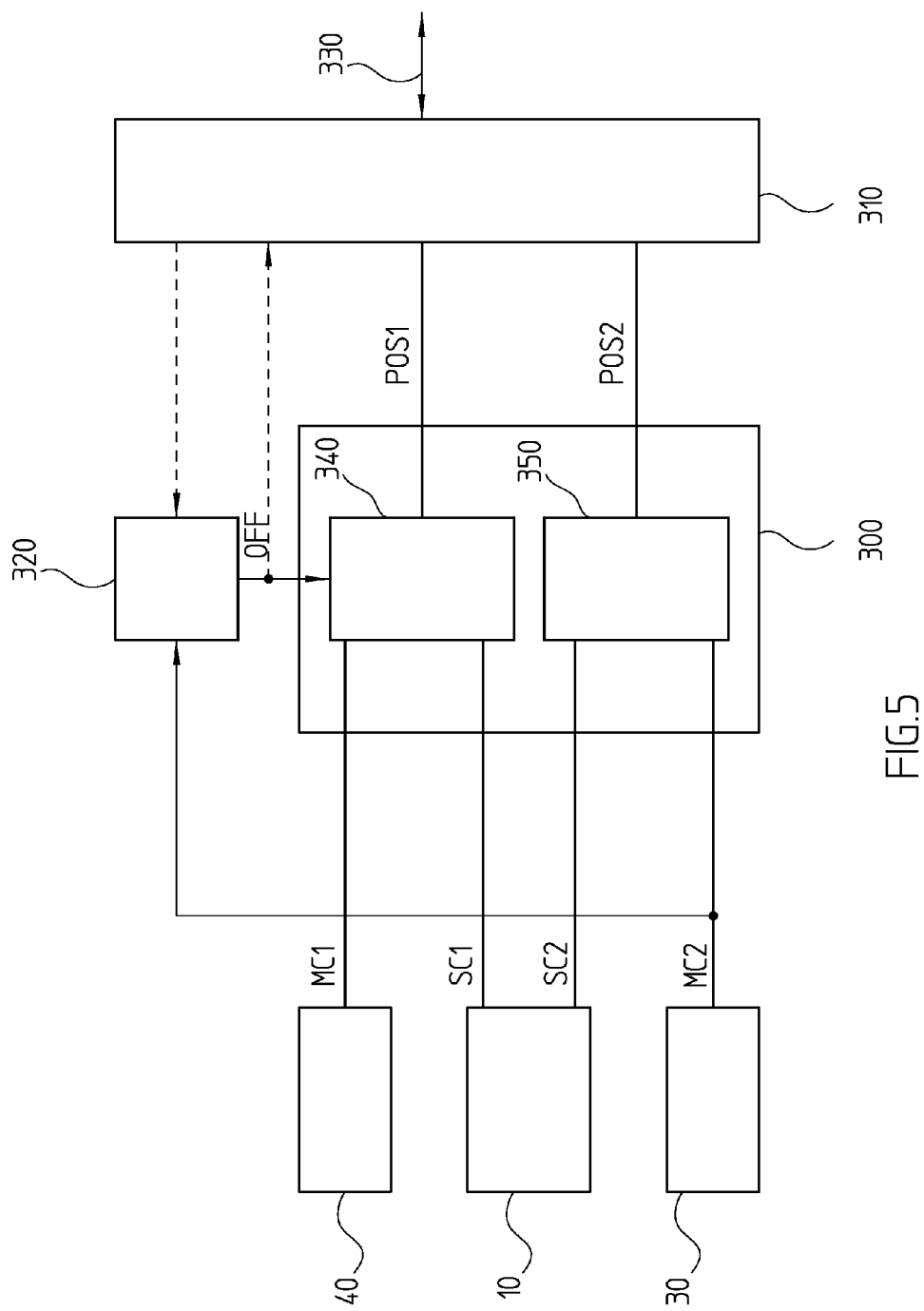
FIG. 5 is a block diagram of the multiturn rotary encoder illustrated in FIG. 4.

FIG. 5, however, is a block diagram of a multiturn rotary encoder illustrated in FIG. 4, in which an alternative possibility is described for the referencing. The multiturn rotary encoder includes single-turn unit 10, first multiturn unit 40, and second multiturn unit 30, whose output signals SC1, SC2, MC1, MC2 are fed to a processing unit 300. It includes two code-connecting units 340, 350 which, from a single-turn code word SC1 or SC2 and a multiturn code word MC1 or MC2 each, form a position-data word POS1 or POS2. An interface unit 310 for communication and data transmission between the multiturn rotary encoder and sequential electronics via a data-transmission channel 330 is provided in this exemplary embodiment, as well.

An initialization unit 320 is again provided for referencing first multiturn code word MC1 with the value of second multiturn code word MC2. Initialization unit 320 is arranged such that after the power supply has been switched on, as soon as second multiturn code word MC2 is available, it stores the value of second multiturn code word MC2 as offset value OFF. Since after the power supply is switched on again, first multiturn unit 40 is reset and begins to count at the value "0," offset value OFF as constant difference between first multiturn code word MC1 and second multiturn code word MC2 is suitable as reference value, and may be taken into account in the further processing and evaluation of multiturn code words MC1, MC2.

Thus, offset value OFF may be supplied to first code-connecting unit 340, for example. It takes offset value OFF into account in forming first position-data word POS1 (by correction of first multiturn code word MC1), so that first position-data word POS1 and second position-data word POS2 again have the same value, and the proper functioning of multiturn units 30, 40 may be ascertained by comparing position-data words POS1, POS2 in the multiturn rotary encoder (as illustrated in FIG. 3) or in the sequential electronics.

Alternatively, offset value OFF may be transmitted via interface unit 310 and data-transmission channel 330 to the sequential electronics and taken into account there in the comparison of position-data words POS1, POS2.

What is claimed is:
1. A multiturn rotary encoder, comprising:
a single-turn unit, including a code carrier scannable by a single-turn scanner in order to generate single-turn position signals, and a single-turn evaluation unit adapted to process the single-turn position signals to form at least one single-turn code word that indicates an absolute position of an input shaft within one revolution;
a first multiturn unit, operable dependent on a supply of power from of a power supply of the multiturn rotary encoder, including at least a first multiturn code carrier scannable by a first multiturn scanner in order to generate first multiturn position signals, and a first multiturn evaluation unit adapted to process the first multiturn position signals to form a first multiturn code word that indicates a number of revolutions executed by the input shaft; and
a second multiturn unit, operable independent of the supply of power from the power supply, including at least a second multiturn code carrier scannable by a second multiturn scanner in order to generate second multiturn position signals, and a second multiturn evaluation unit adapted to process the second multiturn position signals to form a second multiturn code word which also indicates the number of revolutions executed by the input shaft;
wherein a value of the first multiturn code word of the first multiturn unit in an initialization phase responsive to the power supply of the multiturn rotary encoder being switched on is referenced with a value of the second multiturn code word.

2. The multiturn rotary encoder according to claim 1, further comprising an initialization unit adapted initialize the first multiturn unit with the value of the second multiturn code word to perform the referencing after the power supply is switched on.

3. The multiturn rotary encoder according to claim 2, further comprising an interface unit adapted to communicate with sequential electronics via a data-transmission channel and adapted to trigger initialization of the first multiturn unit.

4. The multiturn rotary encoder according to claim 1, further comprising an initialization unit adapted to store the value of the second multiturn code word after the power supply is switched as an offset value that indicates a difference between the value of the second multiturn code word and the value of the first multiturn code word to perform the referencing.

5. The multiturn rotary encoder according to claim 1, wherein the first multiturn unit includes a counter-based multiturn unit.

6. The multiturn rotary encoder according to claim 1, wherein the second multiturn unit includes a gear-based multiturn unit.

7. A method for operating a multiturn rotary encoder, including: a single-turn unit, including a code carrier scannable by a single-turn scanner in order to generate single-turn position signals, and a single-turn evaluation unit adapted to process the single-turn position signals to form at least one single-turn code word that indicates an absolute position of an input shaft within one revolution; a first multiturn unit, operable dependent on a supply of power from a power supply of the multiturn rotary encoder, including at least a first multiturn code carrier scannable by a first multiturn scanner in order to generate first multiturn position signals, and a first multiturn evaluation unit adapted to process the first multiturn position signals to form a first multiturn code word that indicates a number of revolutions executed by the input shaft; and a second multiturn unit, operable independent of the supply of power from the power supply, including at least a second multiturn code carrier scannable by a second multiturn scanner in order to generate second multiturn position signals, and a second multiturn evaluation unit adapted to process the second multiturn position signals to form a second multiturn code word which also indicates the number of revolutions executed by the input shaft; comprising:

referencing a value of the first multiturn code word of the first multiturn unit in an initialization phase responsive to the power supply of the multiturn rotary encoder being switched on with a value of the second multiturn code word.

8. The method according to claim 7, wherein for the referencing after the power supply has been switched on, the first multiturn unit is initialized by an initialization unit with the value of the second multiturn code word.

9. The method according to claim 8, wherein an interface unit is provided for communication with sequential electronics via a data-transmission channel, and the initialization of the first multiturn unit is triggered by the interface unit.

10. The method according to claim 7, wherein for the referencing, the value of the second multiturn code word after the power supply has been switched on is stored by an initialization unit as an offset value that indicates a difference between the value of the second multiturn code word and the value of the first multiturn code word.

* * * * *